(12) United States Patent
Cho (10) Patent No.: US 11,314,972 B2
(45) Date of Patent: Apr. 26, 2022

(54) OBJECT DETECTION APPARATUS AND METHOD FOR VEHICLE

(71) Applicant: Hyundai Mobis Co., Ltd., Seoul (KR)

(72) Inventor: Heung Rae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 241 days.

(21) Appl. No.: 16/801,558

(22) Filed: Feb. 26, 2020

(65) Prior Publication Data

US 2020/0272831 A1 Aug. 27, 2020

(30) Foreign Application Priority Data

Feb. 26, 2019 (KR) .................. 10-2019-0022268

(51) Int. Cl.
| | |
|---|---|
| G06K 9/00 | (2006.01) |
| G06T 11/20 | (2006.01) |
| H04N 5/225 | (2006.01) |
| H04N 5/247 | (2006.01) |
| H04N 5/235 | (2006.01) |
| G06T 7/00 | (2017.01) |
| G06T 7/73 | (2017.01) |

(52) U.S. Cl.
CPC ............ *G06K 9/00791* (2013.01); *G06T 7/73* (2017.01); *G06T 7/97* (2017.01); *G06T 11/20* (2013.01); *H04N 5/2253* (2013.01); *H04N 5/2256* (2013.01); *H04N 5/2354* (2013.01); *H04N 5/247* (2013.01); *G06T 2207/30252* (2013.01); *G06T 2210/12* (2013.01)

(58) Field of Classification Search
CPC ........... G06K 9/00791; G06K 9/00805; G06K 9/2036; G06K 9/3233; G06K 9/4661; G06T 7/73; G06T 7/97; G06T 11/20; G06T 2207/30252; G06T 2210/12; G06T 2207/10016; G06T 7/55; G06T 5/50; G06T 7/557; H04N 5/2253; H04N 5/2256; H04N 5/2354; H04N 5/247; H04N 5/23218; H04N 5/144; H04N 5/265
USPC ........................................................ 382/103
See application file for complete search history.

(56) References Cited

U.S. PATENT DOCUMENTS

| | | | |
|---|---|---|---|
| 9,046,364 B2 | 6/2015 | Kojo et al. | |
| 10,614,617 B2 | 4/2020 | Fortmann | |

FOREIGN PATENT DOCUMENTS

| | | |
|---|---|---|
| JP | 2009-294842 | 12/2009 |
| JP | 2013-093865 | 5/2013 |
| JP | 5472538 | 4/2014 |
| KR | 10-2014-0065210 | 5/2014 |

(Continued)

*Primary Examiner* — Stephen P Coleman
(74) *Attorney, Agent, or Firm* — H.C. Park & Associates, PLC (57) ABSTRACT

An object detection apparatus includes a first camera unit, a second camera unit, and a control unit. The first camera unit includes one or more cameras, and is configured to capture an image around a vehicle. The second camera unit includes one or more cameras, and is configured to capture an image of an area ahead of the vehicle. The control unit is configured to: determine a displacement of a feature point positioned in a common area from the image acquired via the first camera unit; determine a pixel displacement of the feature point in the image acquired via the second camera unit; and determine distance information to an object recognized in the image captured via the second camera unit based on the displacement of the feature point and the pixel displacement of the feature point.

20 Claims, 6 Drawing Sheets

(56) References Cited

FOREIGN PATENT DOCUMENTS

| KR | 10-2017-0119167 | 10/2017 |
| KR | 10-2018-0118545 | 10/2018 |

OBJECT DETECTION APPARATUS AND METHOD FOR VEHICLE

CROSS-REFERENCE TO RELATED APPLICATION

This application claims priority to and the benefit of Korean Patent Application No. 10-2019-0022268, filed Feb. 26, 2019, which is hereby incorporated by reference for all purposes as if fully set forth herein.

BACKGROUND

Field

Exemplary embodiments generally relate to an object detection apparatus and method for a vehicle, and more particularly, to an apparatus and method for detecting an object ahead of a vehicle using, for instance, a camera.

Discussion

With the development of automotive electronics technology, more and more techniques are used to assist or replace a driver's driving operation. For example, the techniques may include various techniques from a conventional collision sensing system to an autonomous vehicle. One of the most basic preconditions for utilizing such techniques is to detect an object around a vehicle, and research and development are continuously conducted on such techniques.

An object detection system applied to a vehicle may be implemented with various sensors, such as an ultrasonic sensor, a lidar sensor, a radar sensor, a vision sensor (e.g., camera), etc. The radar sensor may easily recognize position information of an object positioned around an ego-vehicle or distance information from the ego-vehicle, but has difficulties recognizing the shape of the object. The camera may easily recognize the shape of an object, but has difficulties recognizing position information of the object through use of a single camera. Thus, an object detection system that uses a camera and other sensors in combination is typically used.

A conventional object detection system using a variety of sensors is basically configured to not only calculate distance information of a detected object from the ego-vehicle and a bounding box surrounding the detected object, but also transfer the calculated information to a control system for vehicle control. That is, the object detection system transfers the detected object information to, for example, a steering control system, a braking control system, an autonomous driving control system, and/or the like, such that the respective systems can perform vehicle control using the object information.

To perform object detection, more and more vehicles utilize a front camera mounted thereon. Such a front camera is also referred to as a multi-function camera (MFC). In general, the front camera is installed around a room mirror (e.g., rearview mirror) in a vehicle so as to face forward, and thus, captures an image of an area ahead of the vehicle. Such an MFC can capture an image of even an area at quite a long distance ahead of the vehicle, and generally has a wide field-of-view (FOV). As one of various convenience devices of a vehicle, a surround view monitor (SVM) system may be used. Such an SVM system enables a driver in the vehicle to see the area around the vehicle through cameras mounted on the front, rear, and side surfaces of the vehicle. In general, the cameras are installed in a direction facing the ground so as to capture an image of a limited area.

A conventional system and method for detecting an object is disclosed in Korean Patent Application Publication No. 10-2017-0119167, laid-open on Oct. 26, 2017, and entitled "System and Method for Detecting Object."

The above information disclosed in this section is only for understanding the background of the inventive concepts, and, therefore, may contain information that does not form prior art.

SUMMARY

Some aspects provide an object detection apparatus for a vehicle capable of detecting an object using two kinds of camera systems associated with a vehicle.

Some aspects provide an object detection method for a vehicle capable of detecting an object using two kinds of camera systems associated with a vehicle.

Additional aspects will be set forth in the detailed description which follows, and, in part, will be apparent from the disclosure, or may be learned by practice of the inventive concepts.

According to some aspects, an object detection apparatus includes a first camera unit, a second camera unit, and a control unit. The first camera unit includes one or more cameras, and is configured to capture an image around a vehicle. The second camera unit includes one or more cameras, and is configured to capture an image of an area ahead of the vehicle. The control unit is configured to: determine a displacement of a feature point positioned in a common area from the image acquired via the first camera unit; determine a pixel displacement of the feature point in the image acquired via the second camera unit; and determine distance information to an object recognized in the image captured via the second camera unit based on the displacement of the feature point and the pixel displacement of the feature point.

In an embodiment, the control unit may be configured to: determine per-pixel distance information of the image captured via the second camera unit based on the displacement of the feature point and the pixel displacement of the feature point; and determine the distance information to the recognized object using the per-pixel distance information.

In an embodiment, the control unit may be configured to store per-pixel distance information of the image acquired via the first camera unit as predetermined information.

In an embodiment, the common area may be an area in a shooting area of the first camera unit overlapping a shooting area of the second camera unit.

In an embodiment, the first camera unit may include a surround view monitor (SVM) camera and the second camera unit may include a multi-function camera (MFC).

In an embodiment, the object detection apparatus may further include a lamp module configured to illuminate the common area. The control unit may be configured to generate the feature point in the common area via the lamp module.

In an embodiment, the object detection apparatus may further include an illumination sensor and a lamp module. The illumination sensor may be configured to detect illuminance outside the vehicle. The lamp module may be configured to illuminate the common area. The control unit may be configured to generate the feature point in the common area via the lamp module in response to the illuminance satisfying a preset reference value.

In an embodiment, to generate a bounding box for the object, the control unit may be configured to: couple images of adjacent cameras among the cameras of the first and second camera units to form a coupled image; perform object recognition on the coupled image; and generate the bounding box based on the objection recognition.

According to some aspects, an object detection method includes: determining, by a control unit, a displacement of a feature point positioned in a common area of an image acquired via a first camera unit configured to capture an image around the vehicle; determining, by the control unit, a pixel displacement of the feature point in an image acquired via a second camera unit configured to capture an image of an area ahead of the vehicle; and determining, by the control unit, distance information to an object recognized in the image captured via the second camera unit based on the displacement of the feature point and the pixel displacement of the feature point.

In an embodiment, determining the distance information to the object may include: determining, by the control unit, per-pixel distance information of the image captured via the second camera unit based on the displacement of the feature point and the pixel displacement of the feature point; and determining, by the control unit, the distance information to the object using the per-pixel distance information.

In an embodiment, the object detection method may further include causing, at least in part, a lamp module to generate the feature point in the common area before determining the displacement of the feature point.

In an embodiment, the object detection method may further include detecting, by the control unit, illuminance outside the vehicle via an illuminance sensor before generating the feature point. The control unit may be configured to cause, at least in part, the lamp module to generate the feature point in response to the illuminance satisfying a preset reference value.

In an embodiment, the object detection method may further include: coupling, by the control unit, images of adjacent cameras among cameras of the first and second camera units; and generating, by the control unit, a bounding box for an object recognized in the coupled image via object recognition.

In an embodiment, the object detection method may further include causing, at least in part, a lamp module to illuminate the entire common area.

According to some aspects, an apparatus includes at least one processor and at least one memory. The at least one memory includes one or more sequences of one or more instructions configured to, in response to being executed via the at least one processor, cause the apparatus at least to: determine displacement of a feature point via one or more first images, the one or more first images corresponding to an area around a vehicle; determine pixel displacement of the feature point via one or more second images, the one or more second images corresponding to an area in a path of travel of the vehicle; and determine distance information to an object in the second image based on the displacement of the feature point and the pixel displacement of the feature point.

In an embodiment, the feature point may be located in an area common to the one or more first images and the one or more second images.

In an embodiment, the at least one memory and the one or more sequences of one or more instructions may be configured to, in response to being executed via the at least one processor, cause the apparatus at least to: determine per-pixel distance information via the one or more second images based on the displacement of the feature point and the pixel displacement of the feature point; and determine the distance information to the object based on the per-pixel distance information.

In an embodiment, the at least one memory and the one or more sequences of one or more instructions may be further configured to, in response to being executed via the at least one processor, cause the apparatus at least to illuminate a portion of the area in the path of travel of the vehicle to generate the feature point.

In an embodiment, the at least one memory and the one or more sequences of one or more instructions may be further configured to, in response to being executed via the at least one processor, cause the apparatus at least to detect illuminance of an ambient environment. The generation of the feature point may be in response to satisfaction of a predetermined condition by the illuminance.

In an embodiment, the at least one memory and the one or more sequences of one or more instructions may be further configured to, in response to being executed via the at least one processor, cause the apparatus at least to: couple a first image among the one or more first images with a second image among the one or more second images; and generate bounding box information with respect to the object.

According to various exemplary embodiments, an object detection apparatus for a vehicle and an object detection method for a vehicle may detect distance information and a bounding box of an object using two kinds of camera systems mounted in, on, or otherwise associated with the vehicle. Thus, sensors, such as a radar sensor and a lidar sensor, may not be used. Furthermore, the object detection apparatus for a vehicle and the object detection method for a vehicle can improve object recognition performance under a severe environment condition (e.g., low illuminance and backlight) and in a vulnerable area (e.g., low resolution/low image quality) through light emission and image coupling.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments may be described herein with reference to sectional views, isometric views, perspective views, plan views, and/or exploded depictions that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments of an object detection apparatus for a vehicle and an object detection method for a vehicle will be described with reference to the accompanying drawings.

Figure 1:
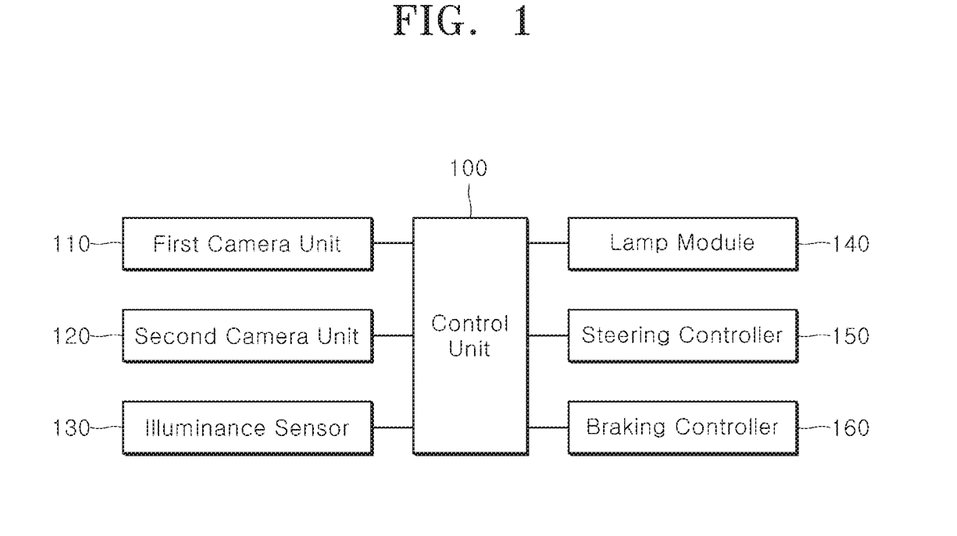
FIG. 1 is a block diagram illustrating a configuration of an object detection apparatus for a vehicle according to some exemplary embodiments.
Figure 2:
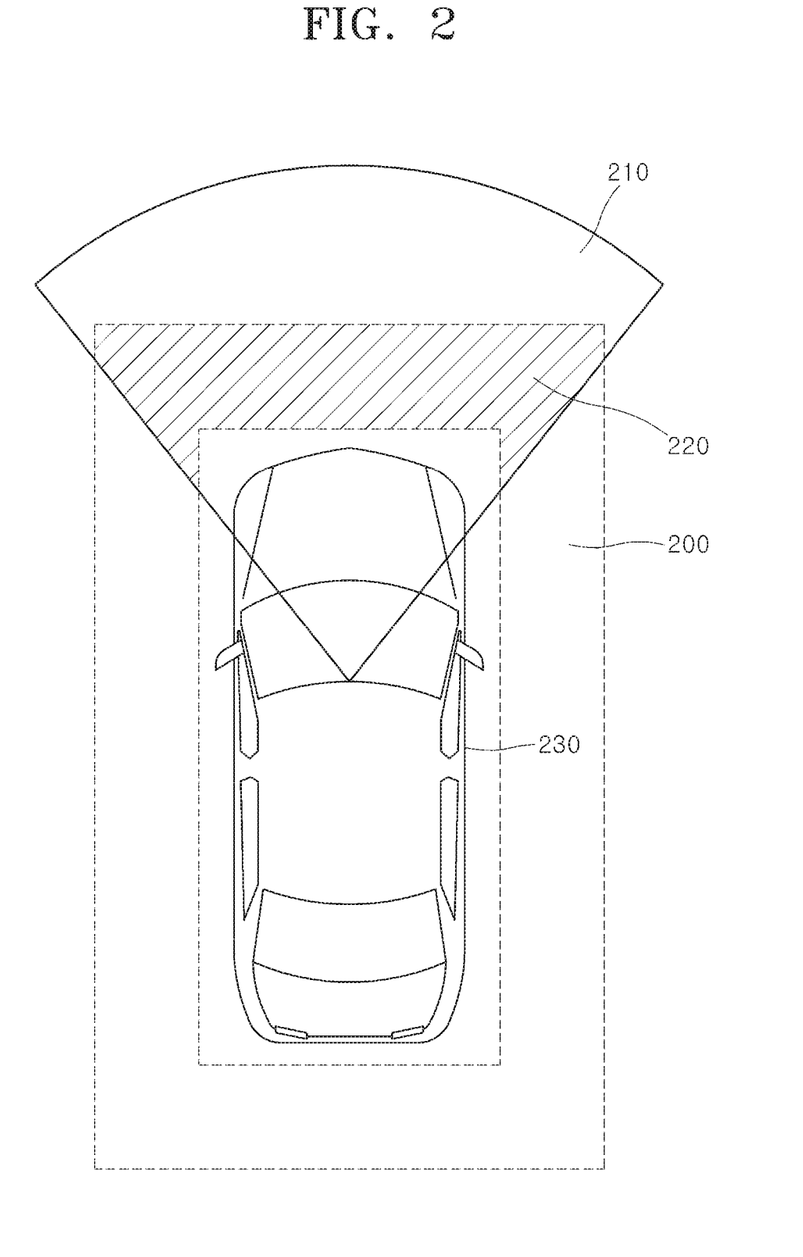
FIG. 2 is a diagram for describing shooting areas of a multi-function camera (MFC) and a surround view monitor (SVM) camera in the object detection apparatus for a vehicle of FIG. 1 according to some exemplary embodiments.

FIG. 1 is a block diagram illustrating a configuration of an object detection apparatus for a vehicle according to some exemplary embodiments. FIG. 2 is a diagram for describing shooting areas of a multi-function camera (MFC) and a surround view monitor (SVM) camera in the object detection apparatus for a vehicle of FIG. 1 according to some exemplary embodiments. Referring to FIGS. 1 and 2, the object detection apparatus for a vehicle in accordance with some exemplary embodiments will be described below.

As illustrated in FIG. 1, the object detection apparatus for a vehicle (such as vehicle 230), according to some exemplary embodiments, may include a control unit 100, a first camera unit 110, a second camera unit 120, an illuminance sensor 130, and a lamp module 140.

Each of the first and second camera units 110 and 120 may be installed to capture an image of an area around the vehicle 230, and include one or more cameras. For example, the first camera unit 110 may be an SVM camera, and the second camera unit 120 may be an MFC. To this end, the first camera unit 110 may be installed to have a shooting angle facing the ground as compared to the second camera unit 120, which may have a shooting angle facing in, for instance, a forward direction, a rearward direction, etc.

FIG. 2 illustrates a shooting area 200 of the first camera unit 110, a shooting area 210 of the second camera unit 120, and a common area 220 where the shooting areas 200 and 210 overlap each other. As will be described below, the object detection apparatus may determine (e.g., calculate) distance information of a forward object using the common area 220 or information determined from the common area 220.

The illuminance sensor 130 may detect (e.g., measure) illuminance of the outside, e.g., of an ambient environment of the vehicle 230.

The lamp module 140 may serve to provide illumination to the outside of the vehicle 230, like a headlight of the vehicle 230. The lamp module 140 may refer to all or some of external lighting apparatuses installed in (or on) the vehicle 230.

The lamp module 140 may be configured to emit light onto the common area 220 of FIG. 2, and may include a laser source, as well as another type of light source.

The control unit 100 may detect an object ahead of the vehicle 230, and transfer information (e.g., distance information and bounding box information) of the detected object to at least one controller, such as a steering controller 150, a braking controller 160, and/or the like, to perform, for instance, an autonomous driving function or anti-collision function.

In some exemplary embodiments, the control unit 100 may first calculate a displacement of a feature point positioned in the common area 220 from an image acquired via the first camera unit 110.

The first camera unit 110 is installed in a direction facing the ground to capture only an image of a limited area, like an SVM camera. Thus, when the first camera unit 110 is installed in the vehicle 230 and then shipped, distance information from the vehicle 230 per pixel of the captured image is decided according to the specification and installation position of the camera and the specification of the vehicle 230. Therefore, the control unit 100 may calculate the displacement of the feature point for a predetermined time using the per-pixel distance information of the first camera unit 110, which may be stored in a memory accessible to, for example, the control unit 100. For instance, the control unit 100 may calculate the displacement of the feature point by multiplying the per-pixel distance of the first camera unit 110 by a pixel displacement of the feature point.

Since such a feature point is positioned in the common area 220, the feature point is also present in an image acquired via the second camera unit 120. Thus, the control unit 100 may also calculate a pixel displacement of the feature point positioned in the common area 220 in the image acquired via the second camera unit 120.

For example, since the second camera unit 120 is configured to face forward instead of the ground, the second camera unit 120 may have difficulties in accurately recognizing distance information of the feature point present in a captured image taken via the second camera unit 120. Thus, the control unit 100 may not directly calculate the displacement of the feature point positioned in the common area 220 from the image acquired via the second camera unit 120, but may calculate a pixel displacement of the feature point for a predetermined time.

The control unit 100 may calculate the per-pixel distance of the image captured via the second camera unit 120 by coupling the displacement of the feature point acquired via the first camera unit 110 and the pixel displacement of the feature point acquired via the second camera unit 120. For example, when the displacement of the feature point acquired via the first camera unit 110 is 10 cm and the pixel displacement of the feature point acquired via the second camera unit 120 is 20 pixels, the per-pixel distance of the image captured via the second camera unit 120 may be calculated as 0.5 cm.

To calculate accurate distance information during such a process, the control unit 100 may synchronize the times of the images of the first and second camera units 110 and 120 or check the calculated distance information by further utilizing the time information and vehicle velocity information of the vehicle 230.

On other hand, no feature point may be present in the common area 220 or the vehicle 230 may be positioned in an environment where it is not easy to detect a feature point, depending on an illuminance condition of the outside. In this case, the control unit 100 may generate a feature point in the common area 220 using the lamp module 140. For instance, the control unit 100 may generate an optical feature point by emitting laser light and/or another type of light onto the common area 220 via the lamp module 140, and calculate the per-pixel distance of the image captured via the second camera unit 120 using the generated feature point as described above.

According to some exemplary embodiments, the control unit 100 may be configured to generate the feature point in consideration of the illuminance of the outside. For example, when the outside illuminance measured via the illuminance sensor 130 is extremely high (e.g., greater than or equal to a backlight reference value) or extremely low (e.g., less than or equal to a low-illuminance reference value), it may not be easy to determine a feature point. Therefore, the control unit 100 may generate an optical feature point by emitting laser light or another type of light onto (or into) the common area 220 through the lamp module 140.

The control unit 100 may change the emission position (e.g., vertical angle) of the laser or other light to calculate the above-described distance information using the generated feature point. In addition, the control unit 100 may be configured to change the emission position of the laser or other light according to the velocity of the vehicle 230 such that the emission position of the laser or other light is fixed to a specific position or set to an absolute position, not a relative position with the vehicle 230.

In some exemplary embodiments, the control unit 100 may be configured to generate a feature point by determining the brightness value of an image captured via the first camera unit 110 and/or the second camera unit 120 without using the illuminance sensor 130, or determine whether to generate a feature point based on a combination of the measured value of the illuminance sensor 130 and the brightness value of the captured image.

The control unit 100 may calculate distance information to an object ahead of the vehicle 230 using the per-pixel distance of the image captured via the second camera unit 120, which has been calculated through the above-described process.

The control unit 100 may also be configured to detect an object from the image captured via the second camera unit 120.

For example, the control unit 100 may calculate a bounding box of an object in the captured image using a conventional image processing technique or an image recognition technique based on deep learning, e.g., an artificial neural network. Since the calculation of the bounding box through the image processing technique or the deep learning-based image recognition technique is widely used in the technical field of the disclosure, detailed descriptions thereof will be omitted herein to avoid obscuring exemplary embodiments.

The control unit 100 may calculate a distance of the calculated bounding box from the vehicle 230 using the above-described per-pixel distance information of the image, and transfer the calculated bounding box and the distance information to other control devices of the vehicle 230 or utilize the information for itself.

The control unit 100 may be configured to perform an operation for improving the recognition performance for an object when detecting the object from the image captured via the second camera unit 120. For example, since the lamp module 140 may be configured to emit light onto the shooting areas of the first and second camera units 110 and 120, the lamp module 140 may emit light onto such areas to improve the recognition performance for an object in a nighttime low-illuminance condition or daytime backlight condition.

For instance, the common area 220 may correspond to the edge portion of the camera where an object is highly likely not to be recognized or to be misrecognized in a frequently used deep learning-based image recognition technique or a conventional image processing technique. Therefore, the control unit 100 may emit light onto the entire common area 220 to improve the object recognition performance.

When the deep learning-based image recognition or the conventional image processing is performed on an image captured through the camera as described above, an edge area may not be accurately recognized in many cases. Therefore, the control unit 100 may be configured to couple images of adjacent cameras among the cameras of the first and second camera units 110 and 120, and perform object recognition by performing the deep learning-based image recognition and/or conventional image processing on the coupled image.

FIGS. 3 to 6 are flowcharts illustrating an object detection method for a vehicle according to various exemplary embodiments.

Figure 3:
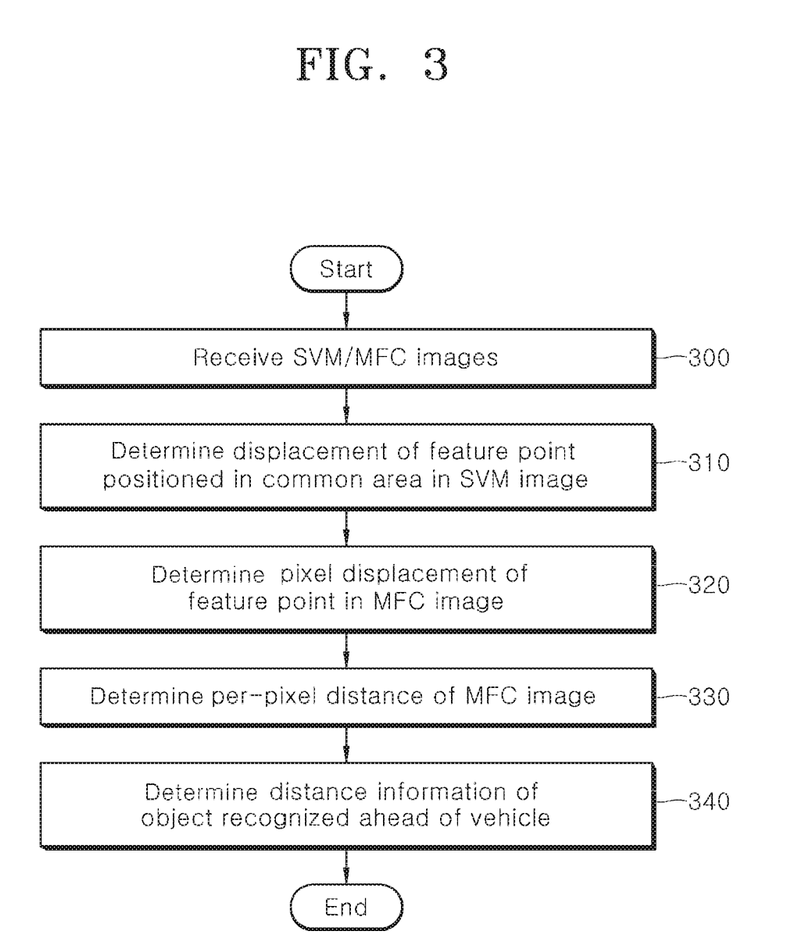
FIGS. 3 to 6 are flowcharts illustrating an object detection method for a vehicle according to various exemplary embodiments.

As illustrated in FIG. 3, the object detection method for a vehicle 230 according to some exemplary embodiments starts with step 300 in which the control unit 100 receives one or more images captured via an SVM camera and one or more images captured via an MFC, such as one or more images captured via first and second camera units 110 and 120.

The control unit 100 may determine (e.g., calculate) a displacement (or location) of a feature point positioned in the common area 220 in the SVM image in step 310. Since the SVM image is obtained by capturing an image of a predetermined area in a direction facing the ground, per-pixel distance information of the SVM image is decided (or predetermined) when the vehicle 230 is shipped. The control unit 100 may calculate a displacement of the feature point for a predetermined time using the per-pixel distance information of the SVM image.

The control unit 100 calculates a pixel displacement of the feature point in the MFC image in step 320. Since the MFC is configured to face forward instead of the ground, it may be difficult to accurately recognize the distance information of the feature point present in the captured image. Thus, the control unit 100 does not directly calculate the displacement of the feature point positioned in the common area 220 in the image acquired via the MFC, but calculates the pixel displacement of the feature point for (or over) a predetermined time.

As part of step 330, the control unit 100 calculates the per-pixel distance of the MFC image based on the displacement of the feature point in the SVM image calculated in step 310, and the pixel displacement of the feature point in the MFC image calculated in step 320. For instance, when the displacement of the feature point in the SVM image is 10 cm and the pixel displacement of the feature point in the MFC image is 20 pixels, the per-pixel distance of the MFC image may be calculated as 0.5 cm.

At step 340, the control unit 100 calculates the distance information of the object recognized ahead of the vehicle 230. For example, the control unit 100 may calculate the distance information of the object detected in the MFC image using the per-pixel distance of the MFC image.

Figure 4:
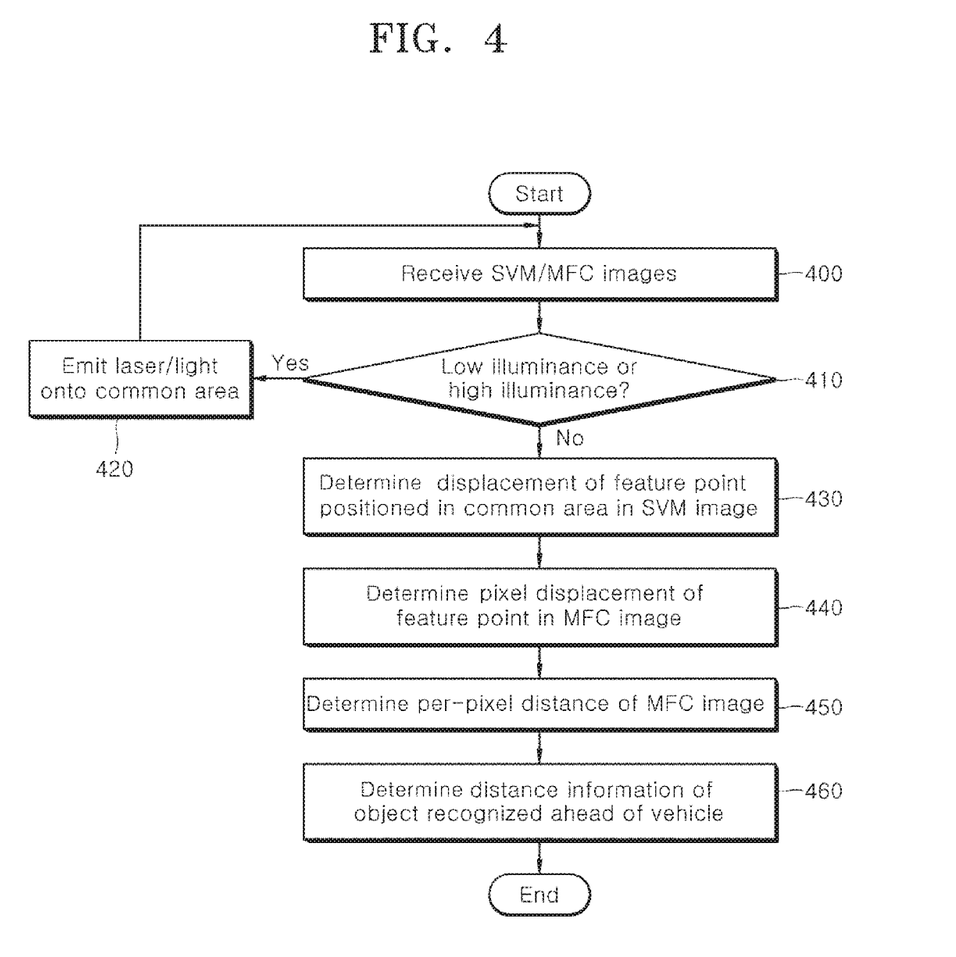

As illustrated in FIG. 4, an object detection method for a vehicle 230 in accordance with exemplary embodiment starts with step 400 in which the control unit 100 receives one or more images captured via an SVM camera and one or more images captured via the MFC, such as one or more images captured via first and second camera units 110 and 120.

In step 410, the control unit 100 determines whether illuminance of the outside corresponds to low illuminance or high illuminance. The control unit 100 may be configured to estimate the outside illuminance by determining whether the outside illuminance measured via the illuminance sensor 130 is extremely high (e.g., greater than or equal to a backlight reference value) or extremely low (e.g., less than or equal to a low-illuminance reference value) or determine the brightness value of the captured image. As another example, the control unit 100 may be configured to estimate the outside illuminance based on a combination of the measured value of the illuminance sensor 130 and the brightness value of the captured image.

When the outside illuminance corresponds to low illuminance or high illuminance, the control unit 100 may emit laser or other type of light onto (or into) the common area 220 to generate a feature point or improve the object recognition performance. For example, since it may be difficult to detect a feature point around the vehicle 230 in the low-illuminance or high-illuminance condition, the control unit 100 may generate an optical feature point by controlling the lamp module 140 to emit laser or other light onto the common area 220.

The common area 220 corresponds to the edge portion of the camera where an object is highly likely not to be recognized or to be misrecognized. Therefore, under the low-illuminance or high-illuminance condition, the control unit 100 may emit light onto the common area 220 to improve the object recognition performance.

Then, the control unit 100 may calculate the distance information of the object through the feature point in steps 430 to 460. This process may be performed in the same manner as steps 310 to 340 of FIG. 3.

Figure 5:
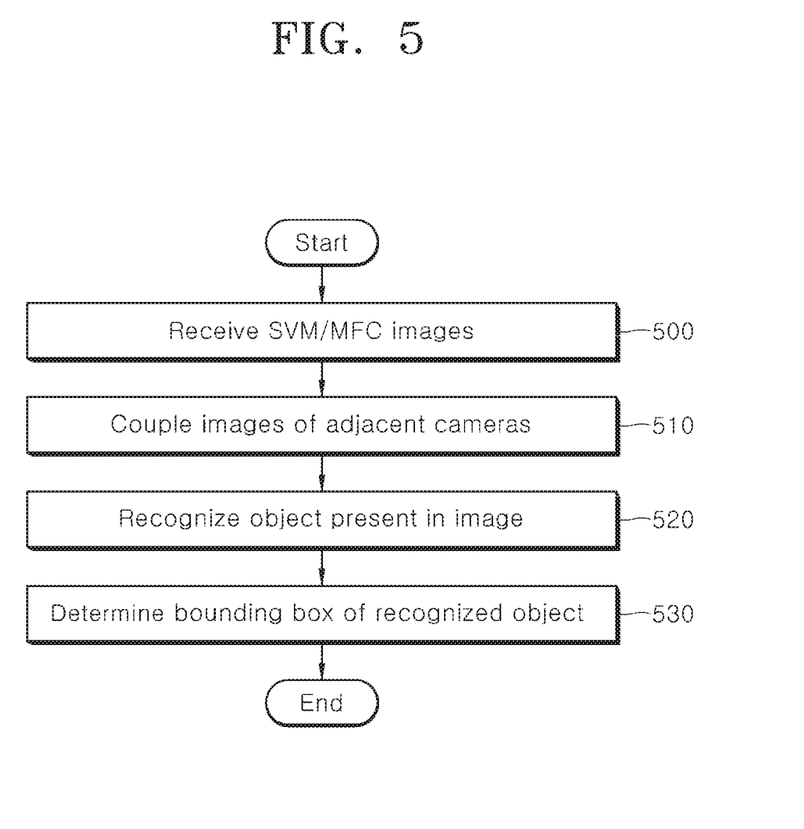

As illustrated in FIG. 5, an object detection method for a vehicle 230 in accordance with some exemplary embodiments starts with step 500 in which the control unit 100 receives one or more images captured via an SVM camera and one or more images captured via the MFC, such as one or more images captured via first and second camera units 110 and 120.

In step 510, the control unit 100 generates a coupled image by coupling images of adjacent cameras among the plurality of cameras. When a deep learning-based image recognition or conventional image processing technique is performed on an image captured via a camera, an edge area may not be accurately recognized in many cases. Thus, the control unit 100 may generate a coupled image by coupling images of the adjacent cameras among the cameras of the MFC and SVM camera.

At step 520, the control unit 100 recognizes an object present in the coupled image, and calculates a bounding box of the recognized object in step 530. For example, when the control unit 100 performs the deep learning-based image recognition or conventional image processing technique on an image captured through a camera, an edge area may not be accurately recognized in many cases. Thus, the control unit 100 may be configured to recognize the object by performing the deep learning-based image recognition or conventional image processing technique based on the coupled image.

Figure 6:
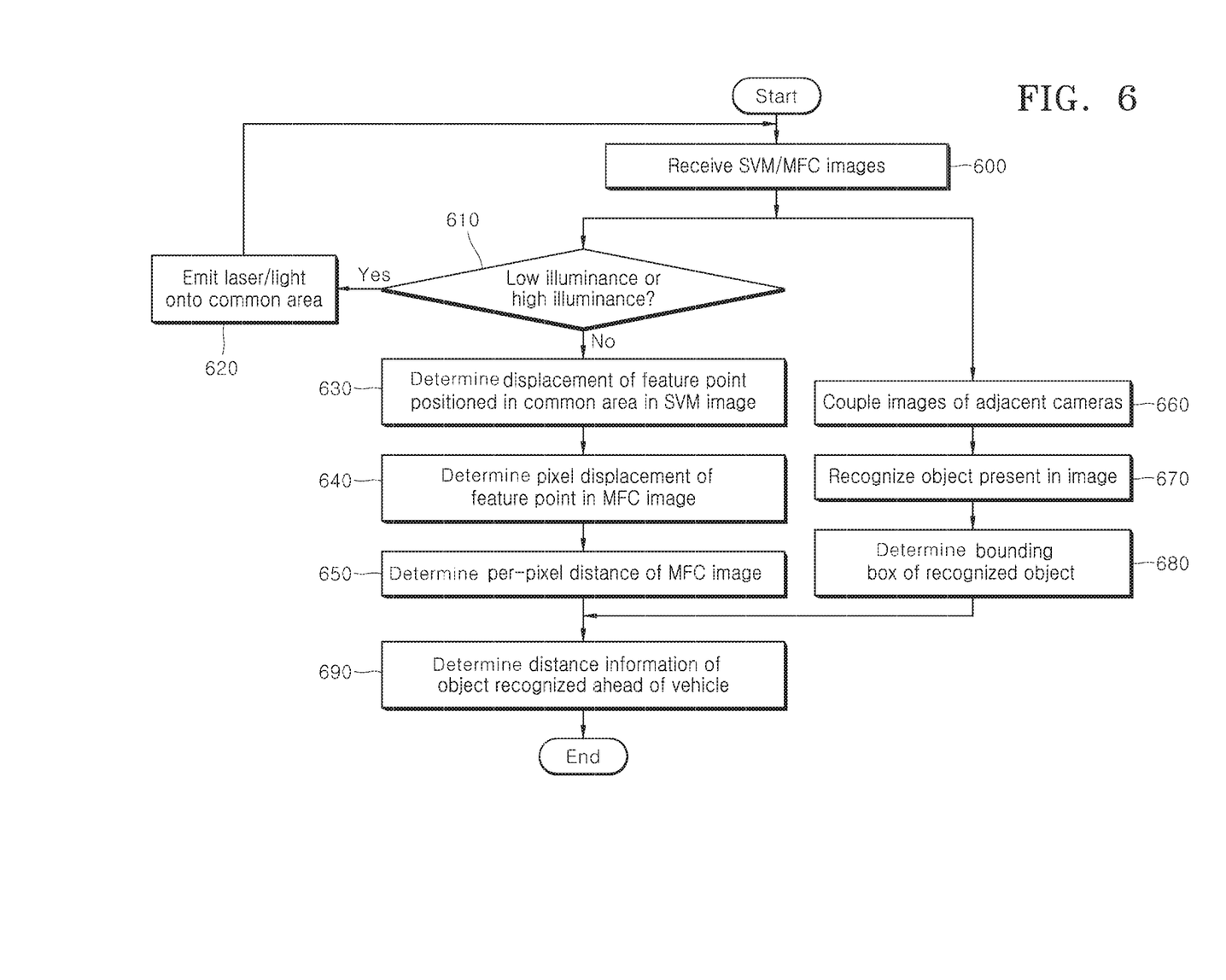

FIG. 6 is a flowchart illustrating the processes of FIGS. 4 and 5 as one process according to some exemplary embodiments. For example, steps 610 to 650 may be performed as described with reference to FIG. 4, and steps 660 to 680 may be performed as described with reference to FIG. 5. Through such operations, the control unit 100 may calculate the per-pixel distance information of the MFC image and the bounding box of the object recognized ahead of the vehicle 230. Therefore, in step 690, the control unit 100 may calculate the distance information of the bounding box of the recognized object, e.g., the distance information of the recognized object.

According to various exemplary embodiments, an object detection apparatus for a vehicle and an object detection method for a vehicle may detect distance information and a bounding box of an object using two kinds of camera systems mounted in, on, or otherwise associated with the vehicle. Thus, sensors, such as a radar sensor and a lidar sensor, may not be used. Furthermore, the object detection apparatus for a vehicle and the object detection method for a vehicle can improve object recognition performance under a severe environment condition (e.g., low illuminance and backlight) and in a vulnerable area (e.g., low resolution/low image quality) through light emission and image coupling.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An object detection apparatus comprising:
   a first camera unit comprising one or more cameras, the first camera unit being configured to capture an image around a vehicle;
   a second camera unit comprising one or more cameras, the second camera unit being configured to capture an image of an area ahead of the vehicle; and
   a control unit configured to:
      determine a displacement of a feature point positioned in a common area from the image acquired via the first camera unit;
      determine a pixel displacement of the feature point in the image acquired via the second camera unit; and
      determine distance information to an object recognized in the image captured via the second camera unit based on the displacement of the feature point and the pixel displacement of the feature point.

2. The object detection apparatus of claim 1, wherein the control unit is configured to:
   determine per-pixel distance information of the image captured via the second camera unit based on the displacement of the feature point and the pixel displacement of the feature point; and
   determine the distance information to the recognized object using the per-pixel distance information.

3. The object detection apparatus of claim 1, wherein the control unit is configured to store per-pixel distance information of the image acquired via the first camera unit as predetermined information.

4. The object detection apparatus of claim 1, wherein the common area is an area in a shooting area of the first camera unit overlapping a shooting area of the second camera unit.

5. The object detection apparatus of claim 1, wherein:
   the first camera unit comprises a surround view monitor (SVM) camera; and
   the second camera unit comprises a multi-function camera (MFC).

6. The object detection apparatus of claim 1, further comprising:
   a lamp module configured to illuminate the common area, wherein the control unit is configured to generate the feature point in the common area via the lamp module.

7. The object detection apparatus of claim 1, further comprising:
an illumination sensor configured to detect illuminance outside the vehicle; and
a lamp module configured to illuminate the common area, wherein the control unit is configured to generate the feature point in the common area via the lamp module in response to the illuminance satisfying a preset reference value.

8. The object detection apparatus of claim 1, wherein, to generate a bounding box for the object, the control unit is configured to:
couple images of adjacent cameras among the cameras of the first and second camera units to form a coupled image;
perform object recognition on the coupled image; and
generate the bounding box based on the object recognition.

9. An object detection method for a vehicle, comprising:
determining, by a control unit, a displacement of a feature point positioned in a common area of an image acquired via a first camera unit configured to capture an image around the vehicle;
determining, by the control unit, a pixel displacement of the feature point in an image acquired via a second camera unit configured to capture an image of an area ahead of the vehicle; and
determining, by the control unit, distance information to an object recognized in the image captured via the second camera unit based on the displacement of the feature point and the pixel displacement of the feature point.

10. The object detection method of claim 9, wherein determining the distance information to the object comprises:
determining, by the control unit, per-pixel distance information of the image captured via the second camera unit based on the displacement of the feature point and the pixel displacement of the feature point; and
determining, by the control unit, the distance information to the object using the per-pixel distance information.

11. The object detection method of claim 9, further comprising:
causing, at least in part, a lamp module to generate the feature point in the common area before determining the displacement of the feature point.

12. The object detection method of claim 11, further comprising:
detecting, by the control unit, illuminance outside the vehicle via an illuminance sensor before generating the feature point,
wherein the control unit is configured to cause, at least in part, the lamp module to generate the feature point in response to the illuminance satisfying a preset reference value.

13. The object detection method of claim 9, further comprising:
coupling, by the control unit, images of adjacent cameras among cameras of the first and second camera units; and
generating, by the control unit, a bounding box for an object recognized in the coupled image via object recognition.

14. The object detection method of claim 13, further comprising:
causing, at least in part, a lamp module to illuminate the entire common area.

15. An apparatus, comprising:
at least one processor; and
at least one memory comprising one or more sequences of one or more instructions configured to, in response to being executed via the at least one processor, cause the apparatus at least to:
determine displacement of a feature point via one or more first images, the one or more first images corresponding to an area around a vehicle;
determine pixel displacement of the feature point via one or more second images, the one or more second images corresponding to an area in a path of travel of the vehicle; and
determine distance information to an object in the second image based on the displacement of the feature point and the pixel displacement of the feature point.

16. The apparatus of claim 15, wherein the feature point is located in an area common to the one or more first images and the one or more second images.

17. The apparatus of claim 15, wherein the at least one memory and the one or more sequences of one or more instructions are configured to, in response to being executed via the at least one processor, cause the apparatus at least to:
determine per-pixel distance information via the one or more second images based on the displacement of the feature point and the pixel displacement of the feature point; and
determine the distance information to the object based on the per-pixel distance information.

18. The apparatus of claim 15, wherein the at least one memory and the one or more sequences of one or more instructions are further configured to, in response to being executed via the at least one processor, cause the apparatus at least to illuminate a portion of the area in the path of travel of the vehicle to generate the feature point.

19. The apparatus of claim 18, wherein:
the at least one memory and the one or more sequences of one or more instructions are further configured to, in response to being executed via the at least one processor, cause the apparatus at least to detect illuminance of an ambient environment; and
generation of the feature point is in response to satisfaction of a predetermined condition by the illuminance.

20. The apparatus of claim 15, wherein the at least one memory and the one or more sequences of one or more instructions are further configured to, in response to being executed via the at least one processor, cause the apparatus at least to:
couple a first image among the one or more first images with a second image among the one or more second images; and
generate bounding box information with respect to the object.

* * * * *